Figure 1:
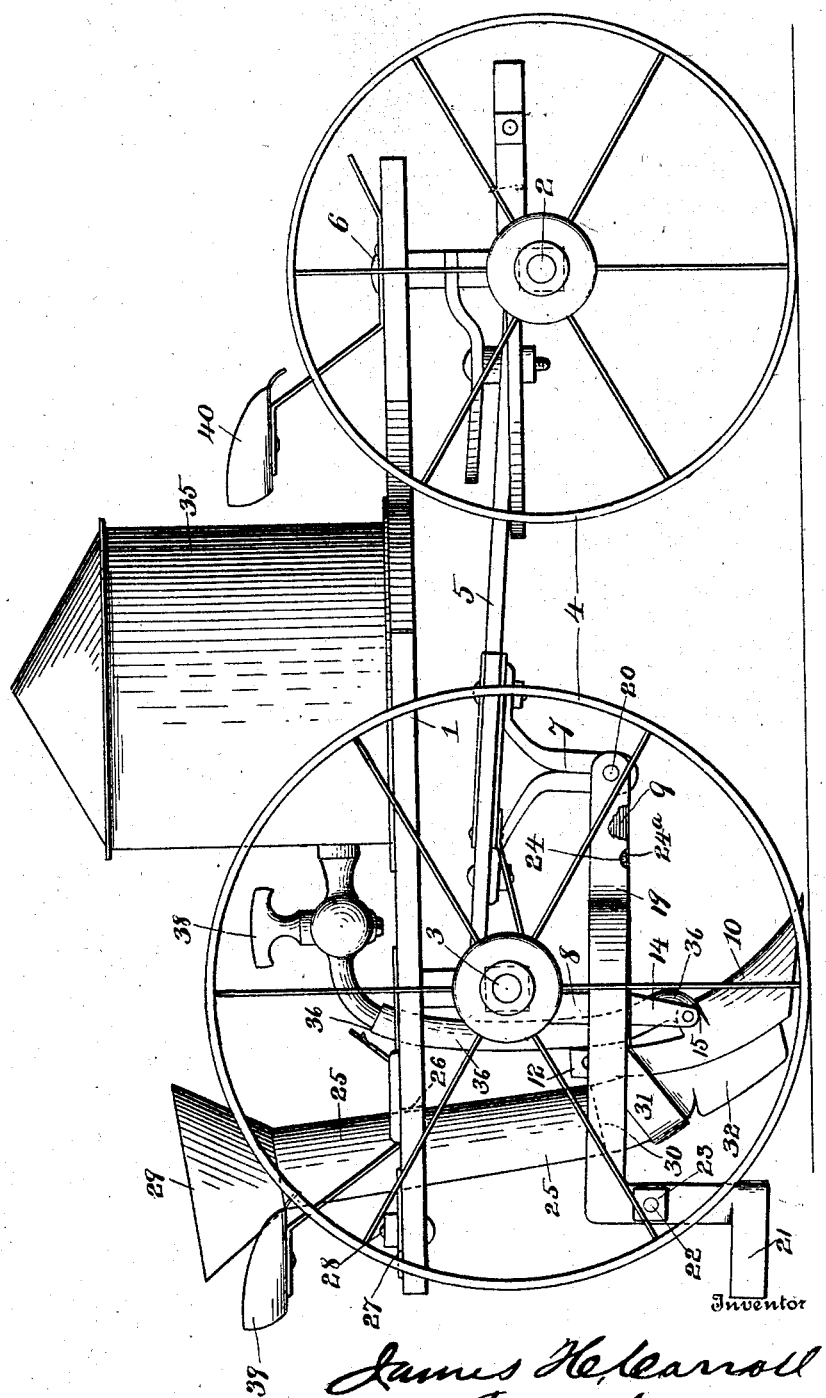

No. 719,995. PATENTED FEB. 10, 1903.
J. H. CARROLL.
VEGETABLE TRANSPLANTING MACHINE.
APPLICATION FILED MAY 22, 1902.
NO MODEL. 3 SHEETS—SHEET 1.

Witnesses
Inventor
James H. Carroll
Attorney

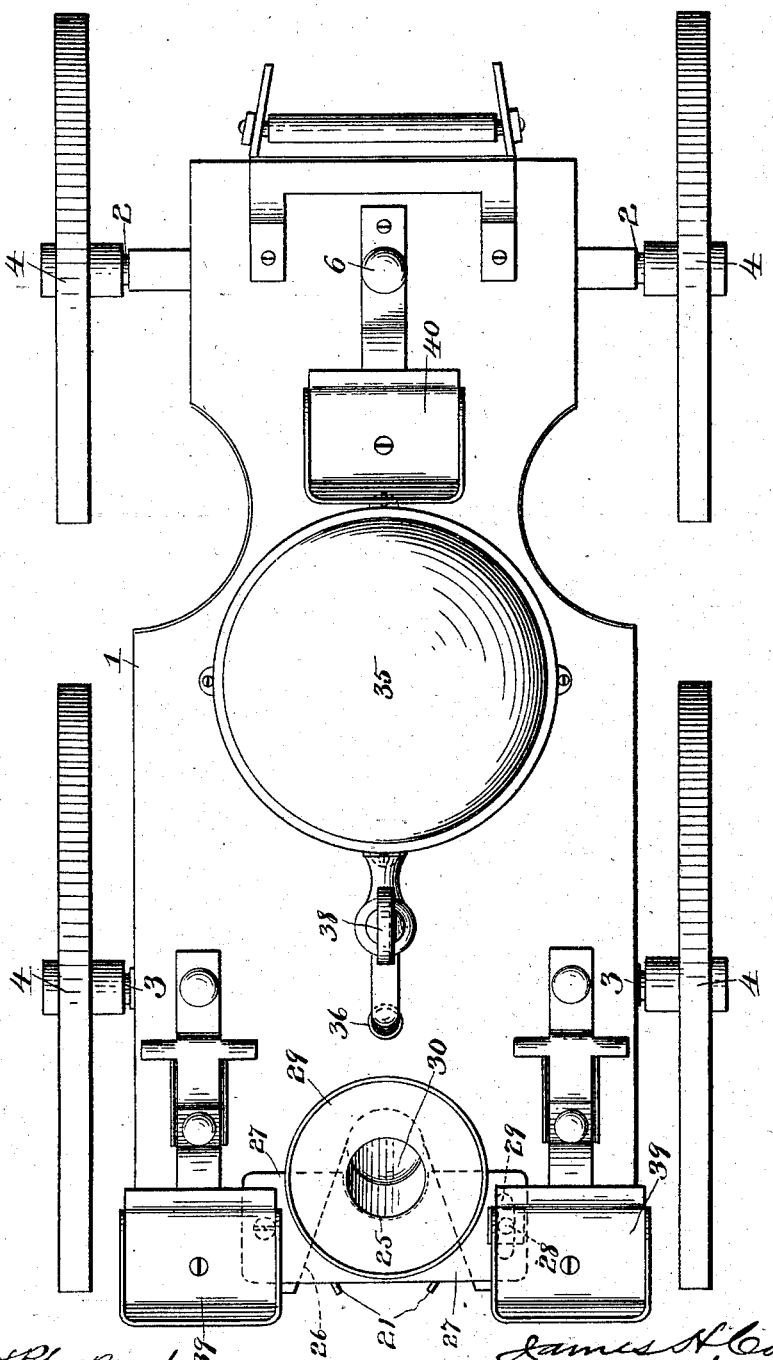

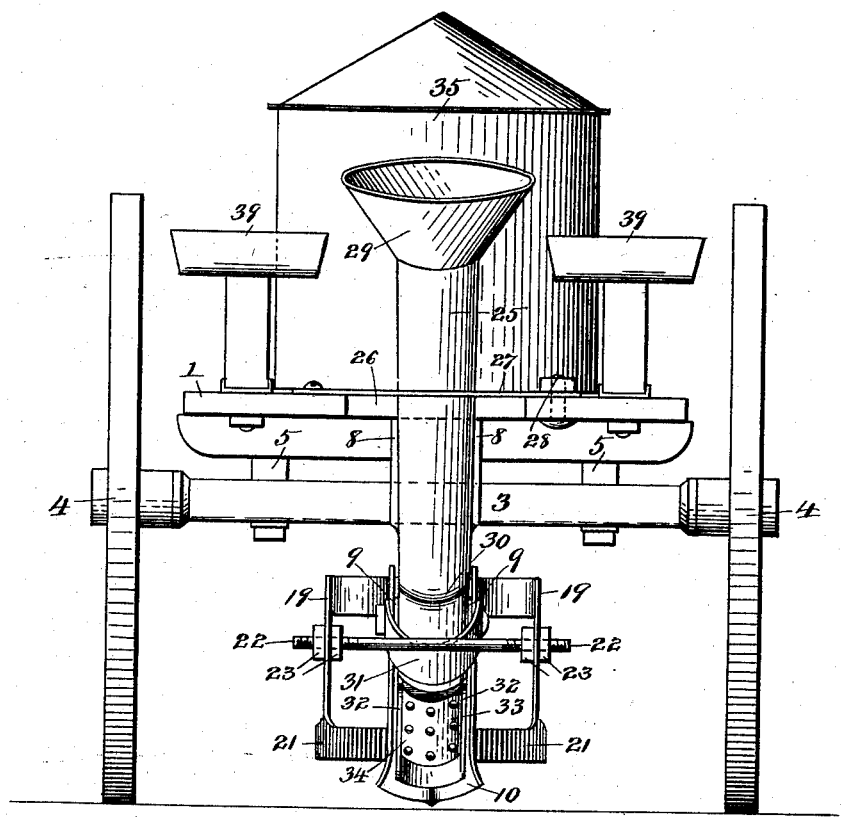
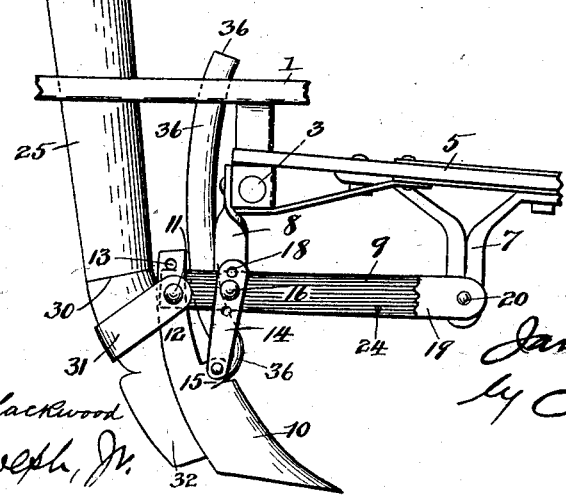
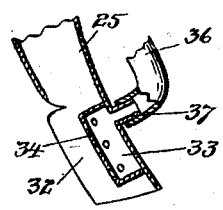

UNITED STATES PATENT OFFICE.

JAMES H. CARROLL, OF WACO, TEXAS.

VEGETABLE-TRANSPLANTING MACHINE.

SPECIFICATION forming part of Letters Patent No. 719,995, dated February 10, 1903.

Application filed May 22, 1902. Serial No. 108,546. (No model.)

*To all whom it may concern:*

Be it known that I, JAMES H. CARROLL, a citizen of the United States, residing at Waco, in the county of McLennan and State of Texas, have invented certain new and useful Improvements in Vegetable-Transplanting Machines, of which the following is a specification.

My invention relates to devices for setting out vegetable-slips—such as tobacco, tomato, cabbage, and potato plants and the like—and has for its object to provide a simple device that will form the furrow, have a spout to carry the plant from the operator to the ground, a sprinkler connected with a tank carried on the machine for irrigating the plant as it is placed in position, and a scraper to fill the furrow after the plant is in place.

The advantages of my invention will more fully appear hereinafter and by reference to the drawings, in which—

Figure 1 is a side view in elevation of my invention; Fig. 2, a top plan view; Fig. 3, a rear view; Fig. 4, an enlarged detail view of the plow and feeding-spout, and Fig. 5 a detail view of the sprinkler.

Referring to the drawings, in which similar reference characters indicate corresponding parts throughout the several views, the platform of my machine is indicated by 1, the front axle by 2, the rear axle by 3, and the truck-wheels by 4, while 5 represents the reach, and 6 the king-pin that pivots the front axle on the platform 1.

7 represents a bracket secured to the reach 5, and 8 brackets to the rear axle 3, and 9 rods secured to said brackets 7 and 8.

10 represents a plowshare secured to the rear of rods 9 by means of a bolt 11 through upwardly-extending arms 12, which are provided with a multiplicity of holes 13 in order to provide for a vertical adjustment of said plowshare.

14 represents links pivoted to ears 15 on the arms 12, which are also secured to the rods 9 by means of bolt 16, said links 14 being provided with a multiplicity of holes 18 in order that the inclination of the point of the plowshare 10 may be adjusted to suit the character of the soil and the nature of the plants to be set out by the machine.

19 represents angular arms pivoted to the front of the rods 9 by means of bolt 20, said arms having rear scraper-blades 21 to fill the furrow made by the plowshare 10, 22 being a rod connecting the two arms 19, which is screw-threaded at each end and provided with nuts 23 on each side of said arms in order to provide for adjusting the space between the scraper-blades 21. It will be readily understood that the arms 19 are free to swing upward to avoid obstructions that may be encountered, the downward movement of said arms being limited by means of a rod 24, inserted through the rods 9 and projecting from each side thereof, fitting into notches 24ª in said arms 19.

25 represents the feeding-spout, secured in notch 26 in the rear of the platform 1 by means of plate 27, pivoted on one side of said notch 26, the other end of said plate being secured, by means of a bolt 28 fitting into a slot 29, in the plate. The spout 25 is provided with a flaring bell-shaped top 29, a tube extending in a substantially vertical direction downward until about the height of the top of rods 9, where it is bent forward, as shown at 30, and is held in the rear of plowshare 10 by means of a strap 31, secured to bolt 11. The lower end of the bent portion 30 is split in the rear and the two parts bent outward to form wings 32 to cause the plant that may be dropped into the spout 25 to remain in the furrow.

In order to irrigate the plant as it is placed in the furrow, I provide a box 33 in the front of the tube 30, said box being provided with a curved wall 34, which is perforated to act as a sprinkler. The box 33 is supplied with water from a tank 35 on the platform 1 through a flexible tube 36, which is connected to a nipple 37, opening into said box 33 through the front of tube 30, 38 representing any suitable valve to regulate the flow of the water through said tube 35.

39 represents seats on each side of spout 25 for the operators, and 40 a seat in the front for the driver.

It will be readily understood from the above description of the construction of my invention that when the machine is in operation the plowshare 10 forms a furrow to receive the plants as they are dropped into the spout 25, while the blades 21 scrape the soil back into the furrow after the plant has been set. It will be further understood that by means of the sprinkler 34 the plants and the surrounding soil are moistened, so as to give the plant nourishment at the beginning of its growth.

Having thus described my invention, what I claim is—

1. In a transplanter, a feeding-spout having rearwardly-extending wings at its lower end, a box in said spout having a curved and perforated wall, and means to supply water to said box, substantially as shown and described.

2. In a transplanter, a vertically-adjustable plowshare, a spout opening behind said plowshare, a sprinkler arranged on the lower end of said spout, and vertically-swinging scrapers behind said spout, substantially as shown and described.

3. In a transplanter a vertically-adjustable plowshare, a spout opening behind said plowshare having rearwardly-extending wings, a box secured in said spout having a perforated wall, means to supply said box with water, and vertically-swinging scrapers behind said spout, substantially as shown and described.

4. In a transplanter, the combination of a platform mounted on wheels, a framework secured under said platform, a plowshare having upwardly-extending arms with a series of holes therein secured to said framework, a spout secured behind said plowshare and extending upwardly through said platform, a sprinkler in the lower end of the spout, a tank on said platform, a flexible tube connecting said tank and sprinkler, and vertically-swinging scrapers behind said spout, substantially as shown and described.

5. In a transplanter, the combination of a platform mounted on wheels, a framework secured under said platform, a plowshare having upwardly-extending arms with a series of holes therein secured to said framework, a spout secured behind said plowshare and extending upwardly through said platform, a box in the lower end of said spout having a curved and perforated wall, a tank on said platform, a flexible tube connecting said tank and box, and vertically-swinging scrapers behind said spout, substantially as shown and described.

6. In a transplanter, the combination of a platform mounted on wheels, a framework secured under said platform, a plowshare having upwardly-extending arms with a series of holes therein secured to said framework, ears on said arms, links pivoted to said ears having a series of holes therein and secured to said framework, a spout secured behind said plowshare, the bottom of said spout open toward the rear and having rearwardly-extending wings, a box in the lower end of said spout having a curved and perforated wall, a tank on said platform, a flexible tube connecting said tank and box, arms pivoted to the front of said framework having downwardly-extending rear ends, and scrapers mounted on said rear ends, substantially as shown and described.

In testimony whereof I hereto affix my signature in the presence of two witnesses.

JAMES H. CARROLL.

Witnesses:
B. D. OWEN,
S. C. BRYANT.